No. 612,568. Patented Oct. 18, 1898.
T. R. MOORE.
PROPELLING MECHANISM FOR BICYCLES.
(Application filed Nov. 15, 1897.)
(No Model.)
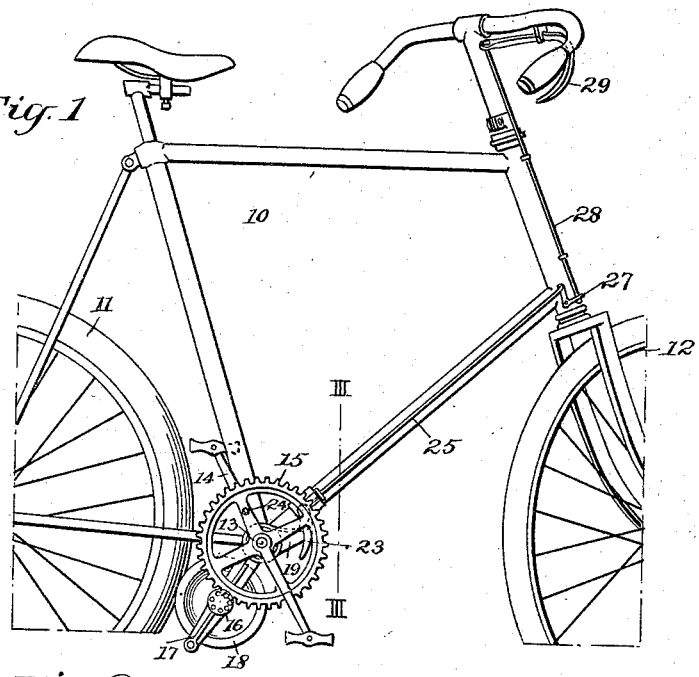
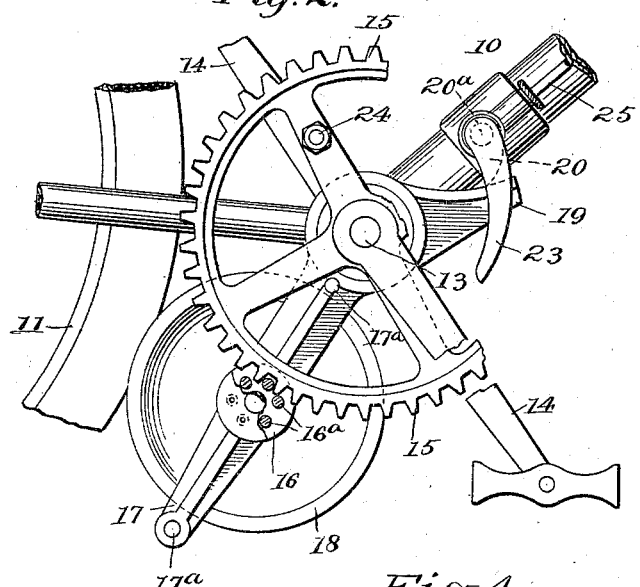
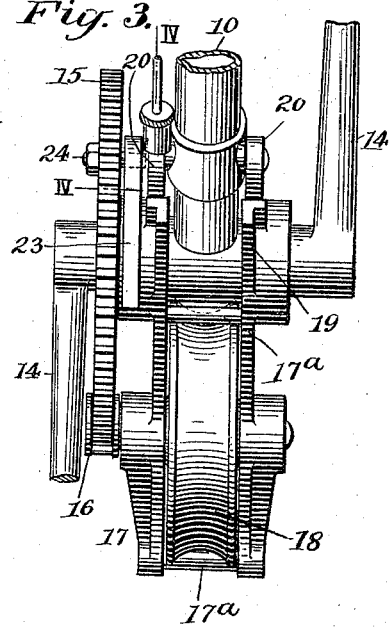
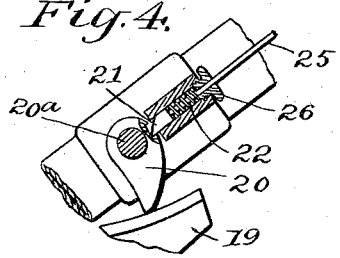
WITNESSES:
INVENTOR
Thomas R. Moore
BY
W. P. Hutchinson,
ATTORNEY.
THE NORRIS PETERS CO., PHOTO-LITHO., WASHINGTON, D. C.

UNITED STATES PATENT OFFICE.

THOMAS R. MOORE, OF WALDEN, NEW YORK.

PROPELLING MECHANISM FOR BICYCLES.

SPECIFICATION forming part of Letters Patent No. 612,568, dated October 18, 1898.

Application filed November 15, 1897. Serial No. 658,525. (No model.)

*To all whom it may concern:*

Be it known that I, THOMAS R. MOORE, of Walden, in the county of Orange and State of New York, have invented certain new and useful Improvements in Propelling Mechanism for Bicycles, &c., of which the following is a full, clear, and exact description.

This invention relates to driving mechanism for manually-propelled vehicles, but more particularly to the driving mechanism for bicycles.

The primary object of the invention is to provide simple and efficient driving mechanism for bicycles and other vehicles which acts upon the tire or periphery of the driving-wheel for propelling the bicycle instead of through the axle thereof, thus dispensing with the usual chain or bevel-gear connection between the pedal-shaft and the shaft or axle of the driving-wheel.

A further object of the invention is to provide simple and efficient mechanism adapted to be employed as driving means for vehicles or as a brake therefor, so that the rider may have the machine under control and may coast with safety down hills without taking his feet off of the pedals, which is readily accessible for repair or otherwise, and which may be readily applied to various forms of velocipedes or other vehicles.

The invention will be hereinafter more particularly described with reference to the accompanying drawings, forming a part of this specification, and then pointed out in the claims at the end of the description.

Referring to the drawings, wherein similar figures of reference designate similar parts throughout the several views, Figure 1 is a side elevation, partly broken away, of a bicycle embodying my invention, the front or steering wheel being turned at an angle to more clearly show some of the parts. Fig. 2 is a side elevation on an enlarged scale, partly broken away and partly in section, of the driving mechanism. Fig. 3 is a vertical sectional view taken on the line III III of Fig. 1, illustrating an end or front view of the driving mechanism; and Fig. 4 is a vertical sectional view taken on the line IV IV of Fig. 3.

The frame 10 of the bicycle may be of the usual or any preferred form and may have the driving-wheel 11, the steering-wheel 12, and the usual bearing in which the pedal-shaft 13 may be journaled. This shaft has the pedal-cranks 14 secured to the ends of the shaft, and adjacent to one end of said shaft may be secured the gear-wheel 15, which is in mesh with the pinion 16. The pinion instead of having the usual teeth may be provided with rollers $16^a$, which engage the teeth of the wheel 15 in order to reduce the friction as much as possible, and may have its shaft journaled in suitable bearings in a yoke 17, to which shaft is secured a wheel 18, having its periphery concaved or made to conform to the contour of the tire or outer portion of the driving-wheel 11, with which the wheel 18 is normally in frictional contact, so that when the latter is rotated motion will be imparted to the wheel 11 to propel the machine.

For the purpose of adapting the wheel 18 to be used as a brake as well as to propel the vehicle without taking the feet off the pedals while coasting or otherwise I may arrange the yoke 17 so as to swing or oscillate on the shaft 13 or, as shown, on the bearing for said shaft. This yoke may comprise two members held or spread apart by rods, as $17^a$, and may have arms, as 19, projecting outwardly therefrom, the upper surface of which may be curved and arranged to engage cams or fingers 20. The cams 20 are secured to a shaft, as $20^a$, journaled in a portion of the frame, and one of the cams is provided with a recess, which is adapted to be engaged by a detent or catch 21, the latter being normally pressed into the recess in the cam by a spring 22. A bolt or projection 24 is secured to the wheel 15 and is adapted when the latter is revolved and the cams 20 released, as hereinafter explained, to engage the lever or arm 23, secured to the shaft $20^a$, and through said lever revolve the cams, so as to engage the arm 19 of the yoke and throw the wheel 18 into frictional engagement with the driving-wheel 11 with the desired pressure, the feet remaining on the pedals and holding the gear 15 and wheel 18 stationary, while by further revolving the cranks 14 the lever 23 will throw the cams 20, so as to be engaged by the detent 21, and if the cranks are now revolved the wheel 11 will be rotated by instead of slipping past the friction-wheel 18. By this means the wheel 18 is adapted to be used either to drive the machine or as a brake therefor.

I have shown and described two cams 20 and arms 19, but obviously one cam and arm will perform the functions above described, although in not quite so perfect a manner.

The detent 21 may be operated in any desired manner, and, as shown, is secured or arranged on a rod 25, which passes through a cap, as 26, arranged on the frame and adapted to form an abutment for the spring 22. The rod 25 may have one end thereof secured to one end of a bell-crank lever 27, located on the head of the frame above the forward forks, the other end of the lever 27 being connected to a rod 28, extending along the head of the machine and connected at its upper end to a pivoted lever 29. This lever 29 may be arranged in a similar manner to the usual brake-lever, so as to move with the handle-bars without moving the bell-crank lever 27, so that as the outer end of the lever 29 is forced upwardly the rod 28 will tilt the lever 27 on its pivot and through the rod 25 disengage the detent 21 from the recess in one of the cams 20, the spring 22 securing the reverse movement of said detent. Instead of the rods 25 and 28 a chain or chains passing around suitably-arranged pulleys or a combination of chains and rods may be employed for operating the detent 21.

The construction and operation of the machine will be readily understood from the foregoing description when taken in connection with the accompanying drawings.

Assuming the parts to be in the position shown in Fig. 1, it will be seen that if the pedals and the cranks 14 are revolved the gear 15 will rotate the pinion 16 and the wheel or pulley 18 and through the latter rotate the driving-wheel 11, so as to propel the vehicle. Should the detent 21 be released, as heretofore explained, the arm or lever 23 and the cams 20 will fall, assisted by the action of the driving-wheel 11, forcing the friction-wheel 18 away therefrom and tilting the yoke 17, and through the arms 19, which engage the cams 20, will rotate the shaft 20ª, so as to carry the recess in one of the cams away from the detent 21 and place the lever 23 in the path of the projection 24 on the gear 15. The wheel 18 may at this time be free of the driving-wheel 11, so as to permit the latter to revolve independently of the driving mechanism, as while coasting; but should it be desired to utilize the wheel 18 as a brake the gear 15 is revolved until the bolt or projection 24 engages the lever 19, thus forcing the lower end of the latter outwardly and through the cams 20, acting on the arms 19 of the yoke 17, will throw the lower end of the latter inwardly and force the wheel 18 against the driving-wheel with any desired pressure, the feet of the rider of course at this time holding the cranks 14 and through them the wheel 18 stationary. If the cranks are now further rotated, the projection 24 will force the lever 23 so as to place the recess in one of the cams in position to be engaged by the detent 21 by the action of the spring 22, at which time by continuing to rotate the pedal-cranks the wheel 18 will be rotated and the vehicle propelled, as already described.

I thus provide a simple and efficient driving mechanism for bicycles and other vehicles which may be used to propel the vehicle or serve as a brake therefor and which dispenses with the usual chain and the bevel-gear connection between the pedal-shaft and the axle of the driving-wheel of such vehicles.

Having thus described my invention, I claim as new and desire to secure by Letters Patent—

1. In a mechanism of the kind described, the combination with the supporting driving-wheel, the frame, and the crank-shaft, of a friction-wheel to engage and rotate the driving-wheel, means actuated from the crank-shaft for moving the friction-wheel into engagement with the periphery of the driving-wheel, and an operative connection between the friction-wheel and the crank-shaft, substantially as described.

2. The combination with the supporting driving-wheel, the frame and the crank-shaft, of a friction-wheel movable out and in in relation to the driving-wheel and adapted to engage the periphery of the drive-wheel to rotate the latter, and mechanism actuated from the crank-shaft for regulating the pressure of the friction on the drive-wheel, substantially as described.

3. The combination with the supporting drive-wheel, the frame and the crank-shaft, of a yoke swinging in a plane parallel with the drive-wheel, a friction-wheel carried by the yoke and adapted to engage and turn the drive-wheel, and mechanism actuated from the crank-shaft to swing the yoke and press the friction-wheel against the drive-wheel, substantially as described.

4. The combination with the frame, the drive-wheel, and the crank-shaft, of a swinging yoke hung adjacent to the crank-shaft, a friction-wheel carried by the yoke to engage the drive-wheel, a gear connection between the friction-wheel and crank-shaft, and a cam mechanism actuated from the gearing to move the yoke and press the friction-wheel against the drive-wheel, substantially as described.

5. In a mechanism of the kind described, the combination with a revoluble shaft, of a friction-wheel adapted to engage a movable portion of a vehicle so as to propel the same, connections between the shaft and wheel for rotating the latter, a yoke pivoted so as to swing with the shaft as a center, the wheel being carried by said yoke, cams engaging portions of the yoke, and means for engaging or disengaging the cams to permit the yoke to or prevent the same from swinging on its pivot, whereby the wheel may serve to drive the vehicle or as a brake therefor, substantially as described.

6. In a mechanism of the kind described, a revoluble shaft, a large gear secured to the shaft, a swinging yoke on which a pinion is journaled, a wheel adapted to propel a vehicle rotatable with the pinion, rotatable cams engaging portions of the yoke, and means for preventing or permitting the cams to rotate, substantially as described.

7. In a mechanism of the kind described, the combination with a shaft and means for rotating said shaft, of a wheel adapted to engage a movable portion of a vehicle so as to propel the same, a gear secured to the shaft, connections between the gear and the wheel so as to rotate the latter, cams engaging a portion of the yoke, a lever movable with the cams, a projection carried by the gear, and means for placing the lever in the path of movement of the projection, substantially as described.

8. The combination with a swinging yoke, of a wheel journaled on the yoke and adapted to propel a vehicle, means for rotating the wheel, oscillating cams engaging a portion of the yoke, a detent adapted to engage one of the cams, a pivoted hand-lever, and connections between the hand-lever and the detent for releasing the latter from the cam, substantially as described.

9. The combination with a swinging yoke, of a wheel journaled on the yoke and adapted to propel a vehicle, means for rotating the wheel, cams engaging a portion of the yoke, a detent adapted to engage one of the cams, means for operating the detent, an arm or lever movable with the cams, and a movable projection adapted to engage the lever, substantially as described.

THOMAS R. MOORE.

Witnesses:
C. W. SADLIER,
J. C. S. GRAHAM.